(12) United States Patent
Liu et al.

(10) Patent No.: US 7,444,717 B2
(45) Date of Patent: Nov. 4, 2008

(54) DISPLAY PANEL ARRANGEMENT HAVING A DETACHABLE FASTENING ELEMENT

(75) Inventors: Chun-Wei Liu, Miao-Li Country (TW); Chiu-Meng Chen, Miao-Li Country (TW); Chi-Hua Yang, Miao-Li Country (TW)

(73) Assignee: Coretronic Corporation, Miao-Li County (TW)

( * ) Notice: Subject to any disclaimer, the term of this patent is extended or adjusted under 35 U.S.C. 154(b) by 9 days.

(21) Appl. No.: 11/495,749

(22) Filed: Jul. 31, 2006

(65) Prior Publication Data

US 2007/0039280 A1 Feb. 22, 2007

(30) Foreign Application Priority Data

Aug. 9, 2005 (TW) .............................. 94126881 A

(51) Int. Cl.
*A44B 21/00* (2006.01)
*F16B 12/00* (2006.01)
*G02F 1/1333* (2006.01)

(52) U.S. Cl. .................................. 24/1; 24/457; 24/531

(58) Field of Classification Search .................. 52/714, 52/770, 773, 774, 360, 489, 357, 285.3, 716.7; 24/457, 531, 545, 1; 312/7.2, 111, 140, 223.1, 312/223.2; 220/4.33, 324; 348/E5.128, E5.129, 348/E5.131

See application file for complete search history.

(56) References Cited

U.S. PATENT DOCUMENTS

| | | | | |
|---|---|---|---|---|
| 3,730,466 A | * | 5/1973 | Swanquist | ............... 248/216.4 |
| 4,439,970 A | * | 4/1984 | Rosner | ........................ 52/511 |
| 4,567,706 A | * | 2/1986 | Wendt | ........................ 52/489.2 |
| 4,881,315 A | * | 11/1989 | Powell et al. | .................. 29/450 |
| 6,600,526 B2 | | 7/2003 | Yano | |
| 6,792,733 B2 | * | 9/2004 | Wheeler et al. | ............. 52/656.1 |

* cited by examiner

*Primary Examiner*—Robert J Sandy
(74) *Attorney, Agent, or Firm*—Muncy, Geissler, Olds & Lowe, PLLC

(57) ABSTRACT

A detachable fastening element to fasten a panel on a front side of a display panel includes a pressing portion, a locating plate, two elastic pressing members, and two hooks. The pressing portion presses the panel on the front side of the display panel. The display panel is mounted onto a bracing seat. The locating plate is coupled with the pressing portion. The elastic pressing members and the hooks are located on the locating plate. Through the elastic pressing members, hooks and locating plate, the fastening element is clipped the bracing seat. Thereby the panel is fastened on the front side of the display panel. The elasticity provided from the elastic pressing members and hooks make installation and removing of the fastening element easier.

5 Claims, 5 Drawing Sheets

DISPLAY PANEL ARRANGEMENT HAVING A DETACHABLE FASTENING ELEMENT

FIELD OF THE INVENTION

The present invention relates to a fastening element, particularly to a detachable fastening element for fastening a panel on a front side of a display panel.

BACKGROUND OF THE INVENTION

The conventional display panel generally is covered by a panel on a front side thereof to protect the display panel from being damaged and extend the lifetime of the display panel. Or the conventional display panel generally is covered by a touch panel on a front side thereof for inputting instructions by touching. Refer to FIG. 1 showing a conventional method for fastening a panel on a display panel, a display panel 100 is mounted onto a bracing seat 110. A panel 120 is fastened to the front side of the display panel 100 through adhesive 130. Thereby protection or instruction input by touching is achieved. However, the adhesive 130 cannot be used repeatedly. If errors occur and repairs are necessary, the adhesive 130 has to be removed by destructive approach. It is difficult to clear up the adhesive 130 thoroughly. The display panel 100 easily tends to be damaged and the display quality is affected.

FIG. 2 shows another conventional fastening method. Referring to FIG. 2, an edge member 150 is extended from an edge of the bracing seat 110, when the panel 120 is fastened on the front side of the display panel 100 through that a pressing plate 140 is fastened to the edge member 150 through a fixing element 160 (such as a bolt or rivet). U.S. Pat. No. 6,600,526, for example, discloses such fastening method which adopts the bolt. However, the conventional method in FIG. 2 takes a lot of time to install and remove the fixing element 160. Moreover, the edge member 150 occupies more space. It is against a prevailing trend that demands thin and small size and increases cost.

SUMMARY OF THE INVENTION

The present invention provides a detachable fastening element to fasten a panel on a front side of a display panel. To achieve the foregoing object, the detachable fastening element according to an embodiment of the present invention includes a pressing portion, a locating plate, two elastic pressing members and two hooks. The display panel is mounted onto a bracing seat. The pressing portion and the locating plate are coupled and formed in an L-shaped structure. The pressing portion presses an upper side of the panel. The locating plate is located on an edge of the bracing seat. The elastic pressing member and the hooks are located symmetrically on the locating plate. According to the embodiment, the fastening element clips the bracing seat through the elastic pressing members, hooks and locating plate so that the panel, display panel and bracing seat are sandwiched firmly between the pressing portion and a hook portion. The elastic pressing members and the hooks provide elasticity to make installation and removing of the locating plate easier. The structure is simple. No additional elements are needed. The cost is lower. It is also made modular easily.

Another object of the invention is to provide a fastening element to achieve precise positioning. To achieve this object, the bracing seat forms a containing portion, such as a cavity or opening, and the locating plate has locating flanges to be latched in the cavity or opening so that the fastening element is precisely fastened on a selected position of the bracing seat.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
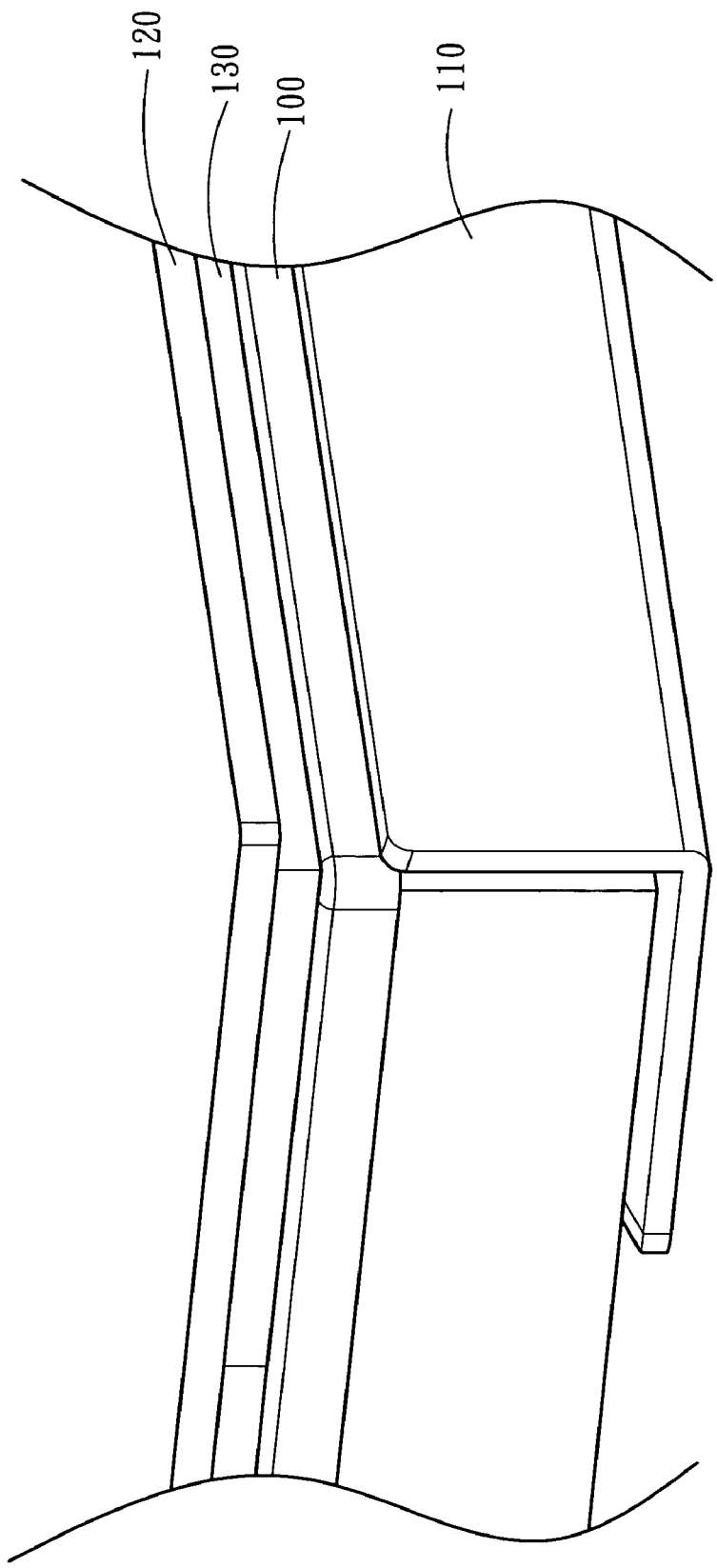
FIGS. 1 and 2 are schematic views of conventional methods for fastening a panel to a display panel.
Figure 2:
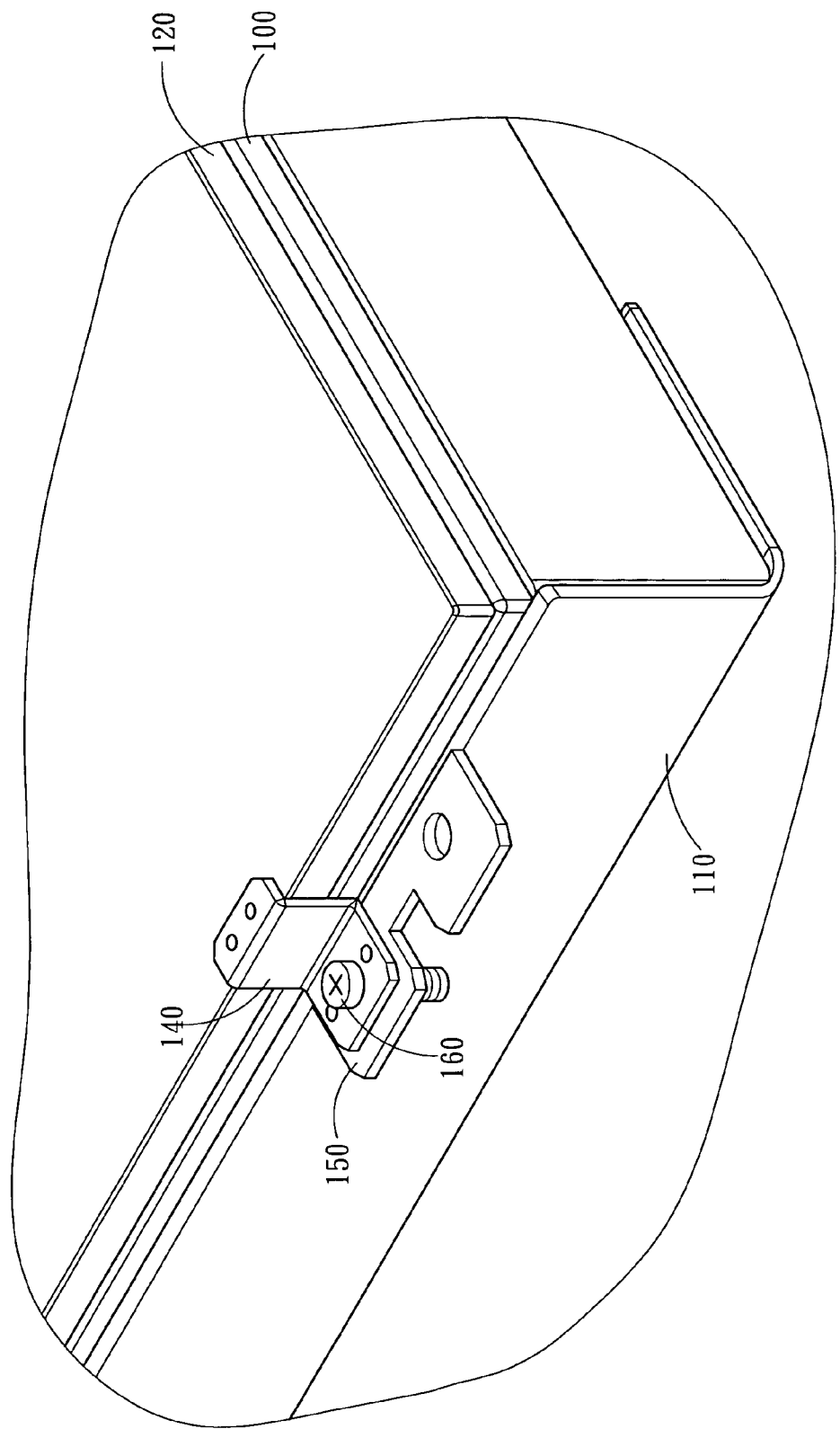
Figure 3:
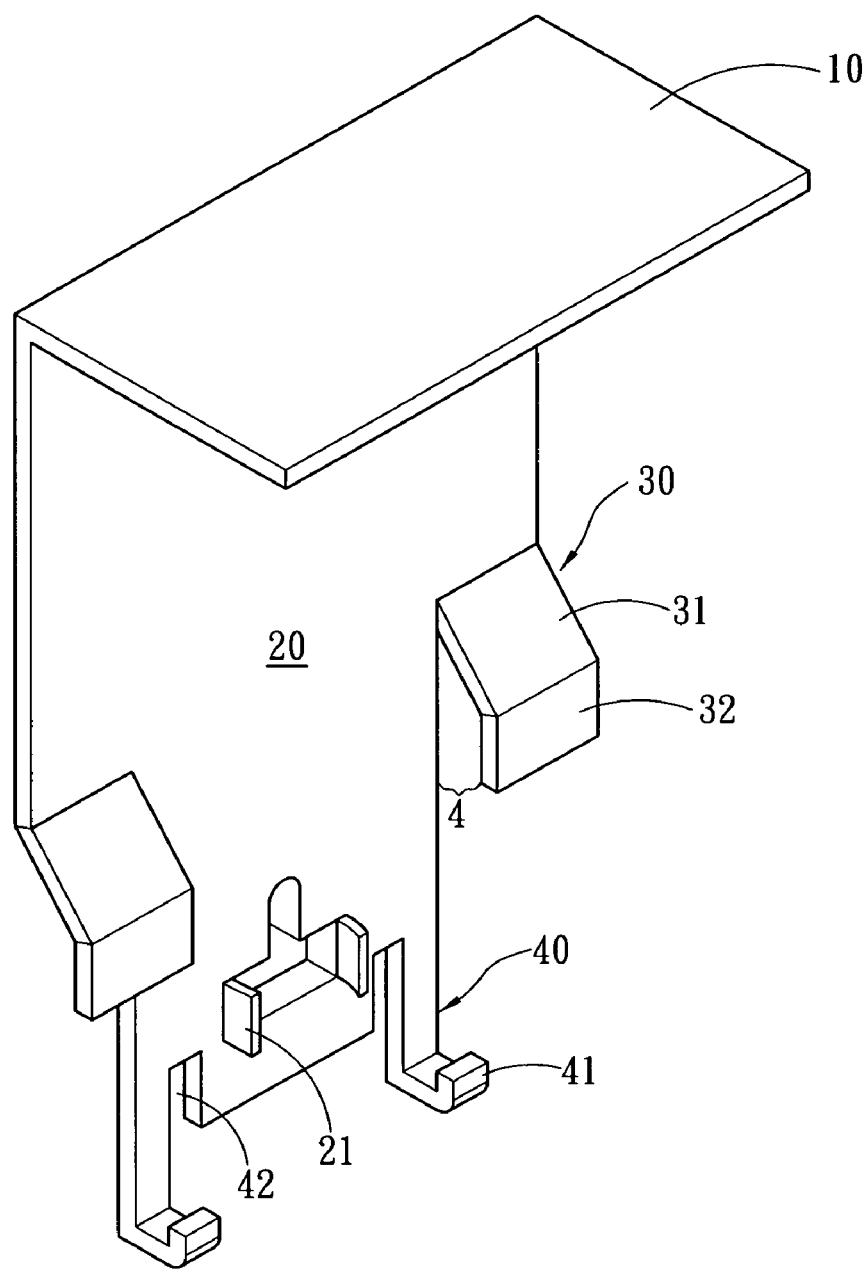
FIG. 3 is a perspective view of a detachable fastening element according to an embodiment of the present invention.

Please refer to FIG. 3, a detachable fastening element according to an embodiment of the present invention includes a pressing portion 10, a locating plate 20, two elastic pressing members 30 and two hooks 40.

Figure 4:
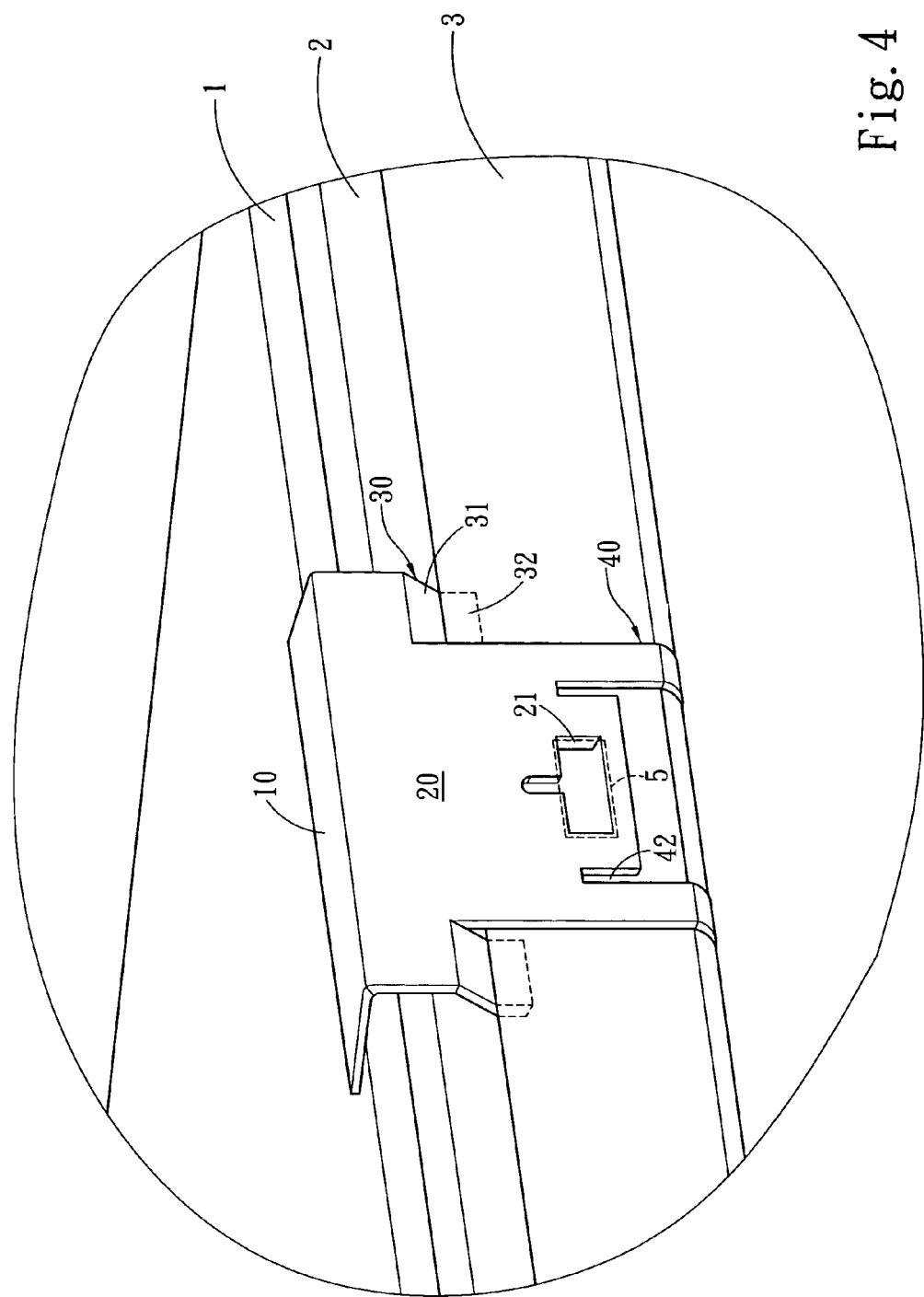
FIG. 4 is a schematic view of the detachable fastening element in an installed condition according to the embodiment of the present invention.

Also referring to FIG. 4, the detachable fastening element is used for fastening a panel 1 on a front side of a display panel 2. The display panel 2 is mounted onto a bracing seat 3. In the embodiment, the panel 1 is a protective panel made from a transparent material such as glass, acrylic or the like to protect the front side of the display panel 2. The panel 1 may also be a touch panel for inputting instructions from users. Furthermore, the panel 1 may also be a polarizing plate.

The pressing portion 10 is coupled with one end of the locating plate 20 to press an upper side of the panel 1. The locating plate 20 is located on a side surface of the bracing seat 3. In the embodiment, the pressing portion 10 and the locating plate 20 are formed in an L-shaped structure.

The elastic pressing members 30 are symmetrically located at two sides of the locating plate 20. Each of the elastic pressing members 30 includes an extension portion 31 extended from the locating plate 20 and a coupling portion 32 connecting to the extension portion 31. The extension portion 31 provides elasticity for the movement of the coupling portion 32. The coupling portion 32 of the elastic pressing member 30 is spaced from the locating plate 20 to form a gap 4 for clipping the bracing seat 3 within the gap 4. In the embodiment, the size of the gap 4 is slightly smaller than the thickness of the bracing seat 3. Hence the elastic pressing member 30 can clip the bracing seat 3 in the gap 4. And the coupling portion 32 is pressed against the bracing seat 3 and maintains an elasticity for returning, which is quite helpful during removing of the detachable fastening element.

The hooks 40 are symmetrically is coupling with one end of the locating plate 20 opposite to the end of the locating plate 20 coupling with the pressing portion 10, and each of the hooks forms a hook portion 41 on the bottom end thereof. The hook portion 41 is formed by bending to clip a lower edge of the bracing seat 3. Thereby, the fastening element clips the bracing seat 3 through the locating plate 20, elastic pressing members 30, and hooks portion 41 so that the panel 1, display panel 2, and bracing seat 3 are sandwiched firmly between the pressing portion 10 and a hook portion 41. The panel 1 is fastened to the front side of the display panel 2. As the bracing seat 3 is clipped by the elastic pressing member 30 within the gap 4, the fastening element is held securely without loosening off.

In addition, a slit 42 is formed on the juncture of the hooks 40 and the locating plate 20. When the detachable fastening element is removed from a lower side of the locating plate 20, the slit 42 provides a deformable elasticity for the hooks 40. The hook portion 41 is not deformed easily by a force, thus the locating effect of the fastening element is not affected.

The fastening element further provides a containing potion 5. The bracing seat 3 forms the contain portion 5 such as a cavity or an opening. The number and location of the cavity or opening vary according to requirements. The locating plate 20 has two locating flanges 21 to be latched in the containing portion 5 correspondingly formed on the bracing seat 3. Thereby the fastening element is precisely fastened on a selected position of the bracing seat 3.

In the embodiment, the detachable fastening element clips the bracing seat 3 through the locating plate 20, the elastic pressing members 30 and the hook portions 41. The pressing portion 10 presses the panel 1 on the front side of the display panel 2. The structure of the embodiment is simple and no additional elements or changes are needed for the original design of the display panel 2 or the bracing seat 3. Therefore, the structure is a modular assembly. Moreover, as the elastic pressing members 30 and the hooks 40 have elasticity, the fastening element is installed and removed easily and repeatable for use to save cost.

Figure 5:
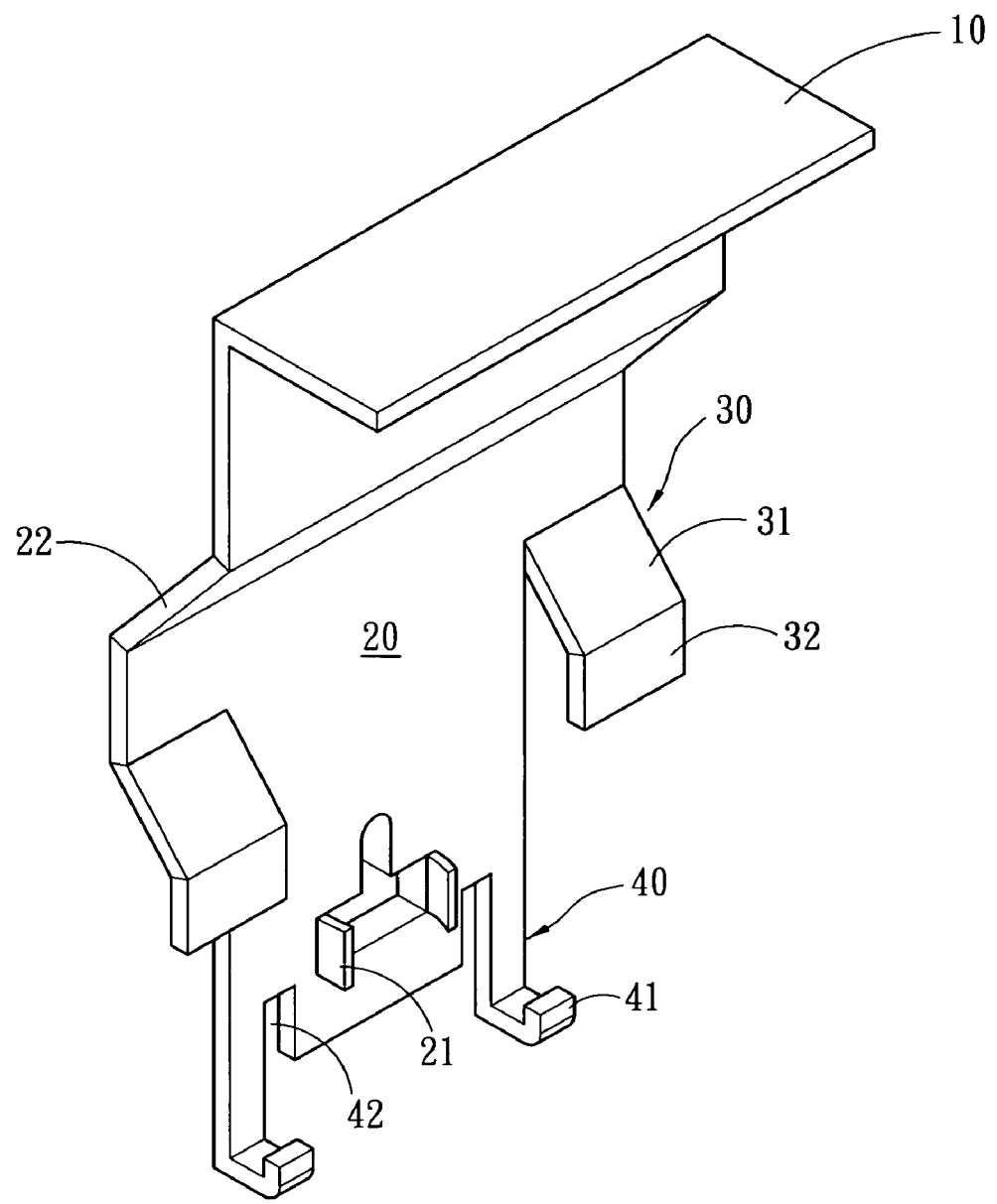
FIG. 5 is a perspective view of the detachable fastening element according to another embodiment of the present invention.

Refer to FIG. 5 according to another embodiment of the present invention. The locating plate 20 further has an elastic bending portion 22 in a middle portion to provide deformation elasticity while removing the detachable fastening element. When the detachable fastening element is removed from the lower side of the locating plate 20, the bending portion 22 provides as a buffer by absorbing the deformation of the locating plate 20. Therefore the pressing portion 10 is not easy to be deformed and the lifetime of the detachable fastening element is extended. When the thickness of the bracing seat 3 increases, the width of the pressing portion 10 is shrunk to make a distance between the pressing portion 10 and the display panel 2 is shorted through the bending portion 22.

In summary, the detachable fastening element is used for fastening the panel 1 on the front side of the display panel 2 through the pressing member 10, the locating plate 20, the elastic pressing members 30, and hooks 40. The detachable fastening element is installed and removed easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A display panel arrangement comprising:
   a bracing seat;
   a display panel mounting on said bracing seat;
   a panel positioned on a front side of said display panel, wherein said panel is selected from a group consisting of a protective panel, a touch panel and a polarizing plate; and
   a detachable fastening element for fastening the panel on the display panel including:
   a locating plate;
   a pressing portion coupling with one end of the locating plate to press the panel;
   two elastic pressing members symmetrically located at two sides of the locating plate, and each of the elastic pressing members spaced from the locating plate to form a gap for clipping the bracing seat within the gap; and
   at least one hook coupling with one end of the locating plate opposite to the end of the locating plate coupling with the pressing portion and having a hook portion on a bottom end thereof formed by bending to clip a lower edge of the bracing seat, so that said bracing seat is clipped between said hook portion and said elastic pressing members.

2. The display panel arrangement of claim 1, wherein the locating plate comprises an elastic bending portion in a middle portion of the locating plate.

3. The display panel arrangement of claim 1, wherein the locating plate comprises at least one locating flange for latching in a containing portion correspondingly formed on the bracing seat, and the containing portion comprises a cavity or an opening.

4. The display panel arrangement of claim 1, further comprising a slit formed on a juncture of the hook and the locating plate.

5. The display panel arrangement of claim 1, wherein each of the elastic pressing members has an extension portion extended from the locating plate and a coupling portion coupling with the extension portion, and the gap is located between the coupling portion and the locating plate.

* * * * *